(12) United States Patent
Sakamoto et al.

(10) Patent No.: US 6,819,638 B1
(45) Date of Patent: Nov. 16, 2004

(54) DRIVING DEVICE FOR AN OPTICAL STORAGE MEDIUM

(75) Inventors: Masato Sakamoto, Kawagoe (JP); Atsushi Kusaka, Tendo (JP)

(73) Assignees: Pioneer Corporation, Tokyo-to (JP); Tohoku Pioneer Corporation, Yamagata-ken (JP)

( * ) Notice: Subject to any disclaimer, the term of this patent is extended or adjusted under 35 U.S.C. 154(b) by 589 days.

(21) Appl. No.: 09/609,371

(22) Filed: Jul. 3, 2000

(30) Foreign Application Priority Data

Jul. 2, 1999 (JP) .......................................... P11-189612

(51) Int. Cl.[7] .............................................. G11B 7/00
(52) U.S. Cl. ............................... 369/44.32; 369/53.18; 369/44.29
(58) Field of Search .......................... 369/44.32, 44.37, 369/44.41, 44.29, 53.12, 53.13, 53.14, 53.15, 53.17, 53.18, 53.19, 53.28

(56) References Cited

U.S. PATENT DOCUMENTS

| | | | | |
|---|---|---|---|---|
| 4,688,202 A | * | 8/1987 | Mukai et al. ............. | 369/44.32 |
| 5,502,698 A | * | 3/1996 | Mochizuki ................ | 369/44.32 |
| 5,606,542 A | * | 2/1997 | Kim ......................... | 369/44.23 |
| 6,259,663 B1 | * | 7/2001 | Tateishi ................... | 369/53.12 |
| 6,341,113 B1 | * | 1/2002 | Kamiyama ............... | 369/53.15 |

* cited by examiner

Primary Examiner—Thang V. Tran
Assistant Examiner—Bach Vuong
(74) Attorney, Agent, or Firm—Young & Thompson

(57) ABSTRACT

A driving device for an optical storage medium, includes: an optical pickup for reading out information from an information track on the optical storage medium; a tracking error signal generator for generating a tracking error signal from the information read out by the optical pickup; a tracking controller for controlling the optical pickup to follow the information track on the optical storage medium based on the tracking error signal generated by the tracking error signal generator; a disturbance detector for detecting a magnitude of a disturbance of the tracking error signal caused by impediments existing on the optical storage medium; a correction signal generator for generating a correction signal corresponding to the magnitude of the disturbance of the tracking error signal detected by the disturbance detector; and a limiting unit for limiting an operation of the tracking controller in accordance with the correction signal generated by the correction signal generator.

12 Claims, 11 Drawing Sheets

BLACK DOT
PASS

THRESHOLD

FIG. 10A

SCRATCH
PASS

THRESHOLD

FIG.11A  Ech

FIG.11B  Fch

FIG.11C  (F−E) TE SIGNAL

POINT C

FIG.11D  DFCT SIGNAL

DRIVING DEVICE FOR AN OPTICAL STORAGE MEDIUM

BACKGROUND OF THE INVENTION

1. Field of the Invention

This invention relates to a tracking servo technique in a driving device for an optical storage medium.

2. Description of Related Art

Generally, in an apparatus for recording or reproducing information on or from a disc such as a Compact Disc (CD), a DVD or a Laser Disc (LD), servo control is needed to accurately read out information from information track (i.e., recording track) formed on the disc. The servo control is to control the speed of an optical pickup for reading information and a disc, the track position and the focus state of a lens by forming a closed feedback loop. For the servo control, an automatic gain control circuit is frequently provided which controls the gain on the basis of the signal inputted by the optical pickup. Particularly, in a technique which performs the automatic gain control by using an external disturbance source, the automatic gain control is effective in measuring the gain of the closed loop to finely control the gain thereby to obtain an appropriate gain value prior to the reproduction operation. Thus, the servo control may be stabilized after the automatic gain control is performed.

However, if there are impediments, such as black dots or surface scratches, on the information track of the disc, defects are introduced to the input signal generated based on the return light supplied from the optical pickup when the light beam passes by such black dot or surface scratch. In such a case, correct input signal cannot be obtained even with the aid of the automatic gain control, and hence the servo control is disturbed. In this view, a conventional apparatus was equipped with a defect detection device for detecting the defect included in the input signal from the optical pickup device. If defect is detected, the drive signal supplied to the driver of the optical pickup device is fixed and held at the DC level before the defect is detected, thereby stabilizing the servo control operation.

In using an optical pickup of three-beam type, the tracking error signal (TE) which is obtained by the subtraction of the return signal of the forward sub-beam from the return signal of the rearward sub-beam is disturbed, and undesired component of horn-like waveform is introduced to the tracking error signal, which is supplied to the driver of the optical pickup device. As a result, the objective lens of the optical pickup is jumped in a certain direction before the above-mentioned holding effect appears. This causes large positional shift of the light beam, which degrades the reproduction performance.

SUMMARY OF THE INVENTION

It is an object of the present invention to provide a driving device for an optical storage medium, which is capable of stabilizing the tracking servo operation at the time when defect is detected, even in use of the three-beam type optical pickup.

According to one aspect of the present invention, there is provided a driving device for an optical storage medium, including an optical pickup for reading out information from an information track on the optical storage medium; a tracking error signal generator for generating a tracking error signal from the information read out by the optical pickup; a tracking controller for controlling the optical pickup to follow the information track on the optical storage medium based on the tracking error signal generated by the tracking error signal generator; a disturbance detector for detecting a magnitude of a disturbance of the tracking error signal caused by impediments existing on the optical storage medium; a correction signal generator for generating a correction signal corresponding to the magnitude of the disturbance of the tracking error signal detected by the disturbance detector; and a limiting unit for limiting an operation of the tracking controller in accordance with the correction signal generated by the correction signal generator.

By the driving device for the optical storage medium thus configured, the optical pickup reads out the information from the information track on the optical storage medium, and the tracking error signal is generated from the information thus read out. The optical pickup is controlled to follow the information track on the storage medium based on the tracking error signal. The magnitude of the disturbance of the tracking error signal, caused by the presence of the impediment on the storage medium, is detected to generate the correction signal corresponding to the magnitude of the disturbance. The correction signal is used to limit the movement of the optical pickup following the information track of the storage medium. Therefore, if the tracking error signal is disturbed by the impediment on the storage medium, the unnecessary operation of the optical pickup is limited by the correction signal corresponding to the magnitude of the disturbance, thereby achieving stable tracking servo control.

In a preferred embodiment, the optical pickup irradiates a main-beam on the information track of the optical storage medium and irradiates two sub-beams at two different positions in a tangential direction and a radial direction of the optical storage medium. Therefore, the stable tracking servo control can be achieved even in use of the three-beam type optical pickup.

In a preferred embodiment, the correction signal may have a fixed time width and a voltage level which is variable in accordance with the magnitude of the disturbance of the tracking error signal. In another preferred embodiment, the correction signal may have a fixed voltage level and a time width which is variable in accordance with the magnitude of the disturbance of the tracking error signal. Therefore, even if the disturbance of the tracking error signal is varying due to the variable shapes of the impediments, the stable tracking servo control can be ensured. The disturbance detector may calculate the magnitude of the disturbance of the tracking error signal by integration.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

According to this embodiment, in a CD driving device having a three-beam type optical pickup, undesired component of horn-like waveform (hereinafter referred to as "horn-like component") included in the tracking error signal (TE) is detected and a correction signal corresponding to the magnitude of the horn-like component is supplied to the driver of the optical pickup, so that the operation of the optical pickup is limited and the tracking servo is stabilized.

The preferred embodiment of the present invention will now be described below with reference to the attached drawings.

Figure 1:
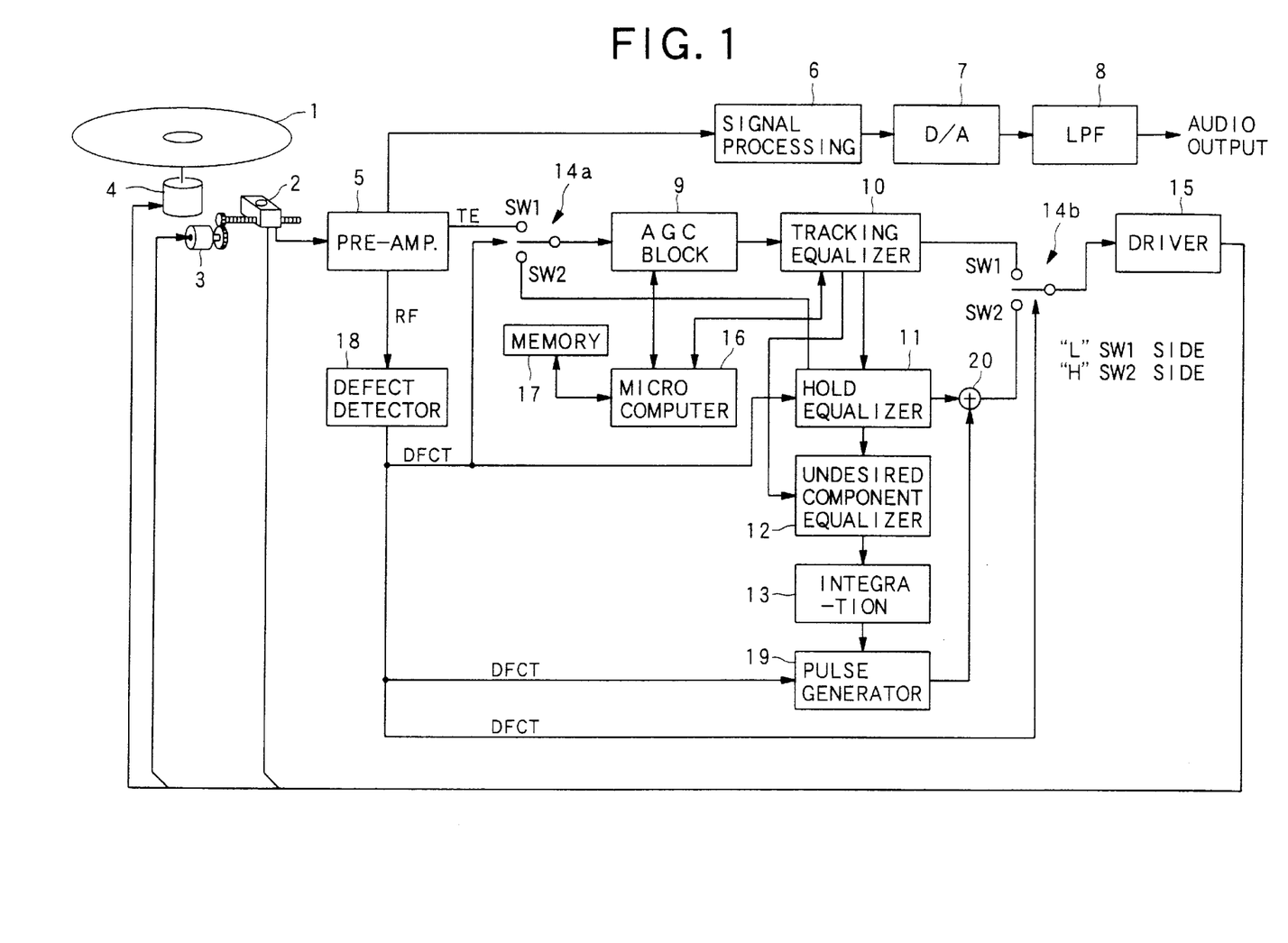
FIG. 1 is a block diagram showing a schematic configuration of a CD driving device according to the present invention.
Figure 2:
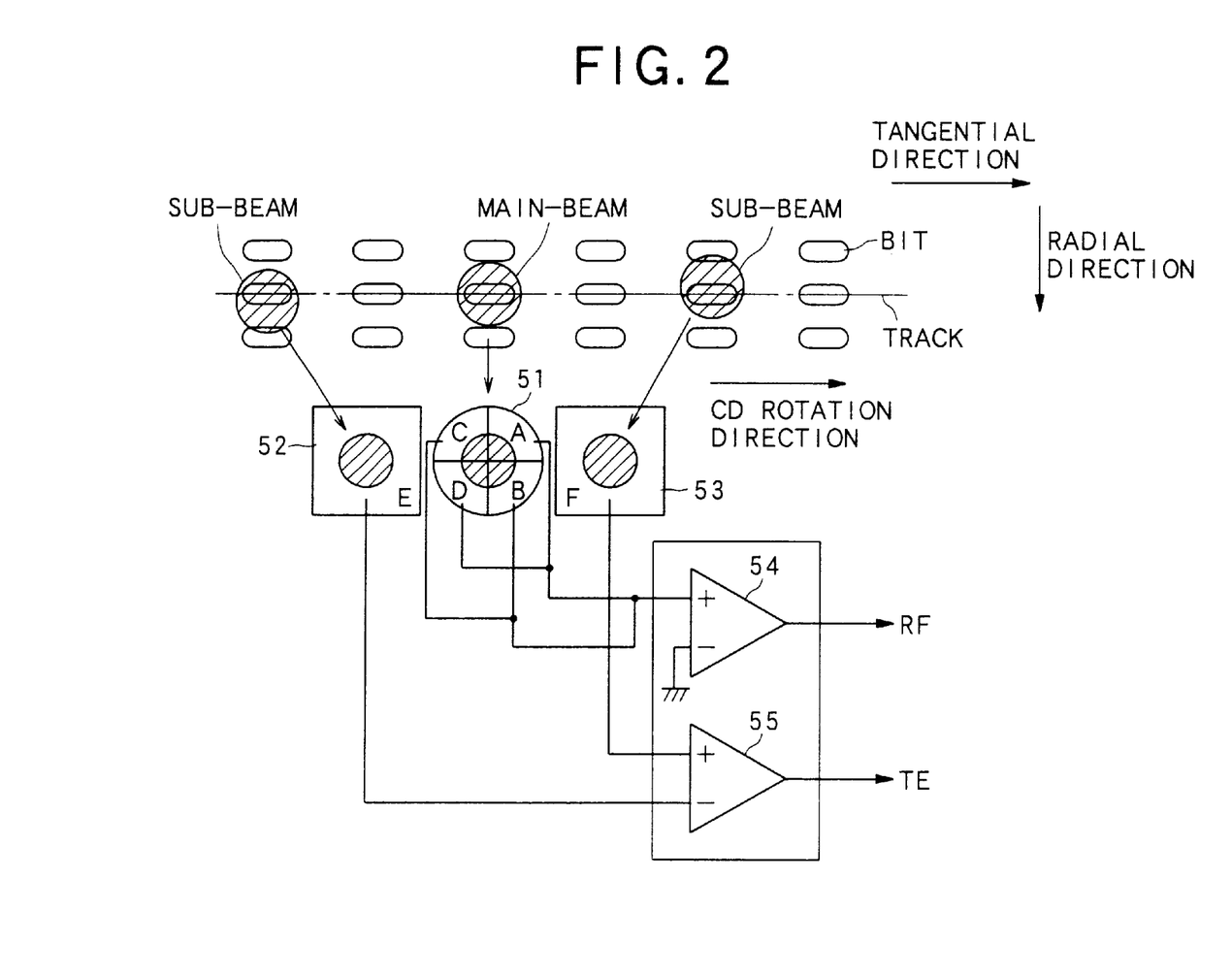
FIG. 2 is a schematic diagram showing the configuration of an optical pickup and a pre-amplifier.

FIG. 1 shows a schematic configuration of a CD driving device according to this embodiment. As shown in FIG. 1, an audio signal demodulation system of the CD driving device includes an optical pickup 2, a carriage motor 3, a spindle motor 4, a pre-amplifier 5, a signal processing unit 6, a D/A converter 7, and a Low Pass Filter (LFP) 8. The disc 1 is an optical storage medium on which information such as music is recorded. The optical pickup 2 reads out the signal recorded on the information track of the disc 1 by a lens (not shown). The optical pickup 2 of the present invention is a three-beam type pickup which divides, by the grating, the light beam emitted by the laser diode into a main-beam for RF signal detection and two sub-beams for the tracking error signal detection. As shown in FIG. 2, the sub-beams are irradiated onto the signal recording surface of the disc 1 to form light spots at the positions slightly shifted from the main-beam in the rotation (tangential) direction and the radial direction of the disc 1. The photodetector unit includes a four-divided photodetector 51 for main-beam and two photodetectors 52, 53 for sub-beams, i.e., three photodetectors in total. The lens in the optical pickup 2 is driven in the radial direction of the disc 1 by a tracking coil (not shown), and is driven by a focus coil (not shown) to perform focus control. Thus, the lens in the optical pickup 2 is controlled by the servo system so as to be appropriately positioned to supply the information read out from the information track to the light receiving unit (not shown). The carriage motor 3 drives the optical pickup 2 in the radial direction of the disc 1, and the spindle motor 4 rotates the disc 1.

The pre-amplifier 5 generates the RF signal and the tracking signal from the read-out signal from the optical pickup 2. As shown in FIG. 2, the adder 54 in the pre-amplifier 5 adds the outputs of the four channels A, B, C and D of the four-divided photodetector 51 to produce the RF signal. The subtracter 55 in the pre-amplifier 5 subtracts the E-channel output of the photodetector 52 for the forward sub-beam from the F-channel output of the photodetector 53 for the rearward sub-beam to produce the tracking error signal (TE). When the main-beam is positioned on the track, the difference between the E-channel output signal based on the forward sub-beam and the F-channel output signal based on the rearward sub-beam is zero. When the main-beam is shifted in the radial direction of the disc 1, one output signal becomes larger and the other output signal becomes smaller, and this difference is detected as the tracking error signal (TE). The signal processing unit 6 generates a CLV signal for the speed control of the spindle motor 4 from the digitized RF signal. In addition, the signal processing unit 6 performs EFM modulation of the RF signal and an error correction demodulation by CIRC to produce 16-bit digital signal to be supplied to the D/A converter 7. The D/A converter 7 converts the 16-bit digital signal into an analog signal. The LPF 8 passes the audible frequency band of the analog signal and eliminates noise component to output the audio signal.

As shown in FIG. 1, the servo system includes an automatic gain control (AGC) block 9, a tracking equalizer 10, a hold equalizer 11, an undesired component detection equalizer 12, an integration circuit 13, switches 14a and 14b, a driver 15, a microcomputer 16, a memory 17, a defect detection circuit 18, a pulse generation circuit 19 and an adder 20. The AGC block 9 controls the gains of the respective error signals supplied from the pre-amplifier 5 to be predetermined levels for the servo system. The tracking equalizer 10 forms a normal servo loop to control the frequency for servo control, and functions as a tracking controller for controlling the optical pickup 2 to follow the information track on the disc 1. The tracking equalizer 10 also functions as a controller of the focus servo. The hold equalizer 11 forms the tracking controller together with the tracking equalizer 10. The hold equalizer 11 eliminates the horn-like component from the tracking error signal (TE) inputted by the tracking equalizer 10 at the time when defect is detected, and holds the tracking level following the eccentric component at a predetermined voltage level.

Figure 3:
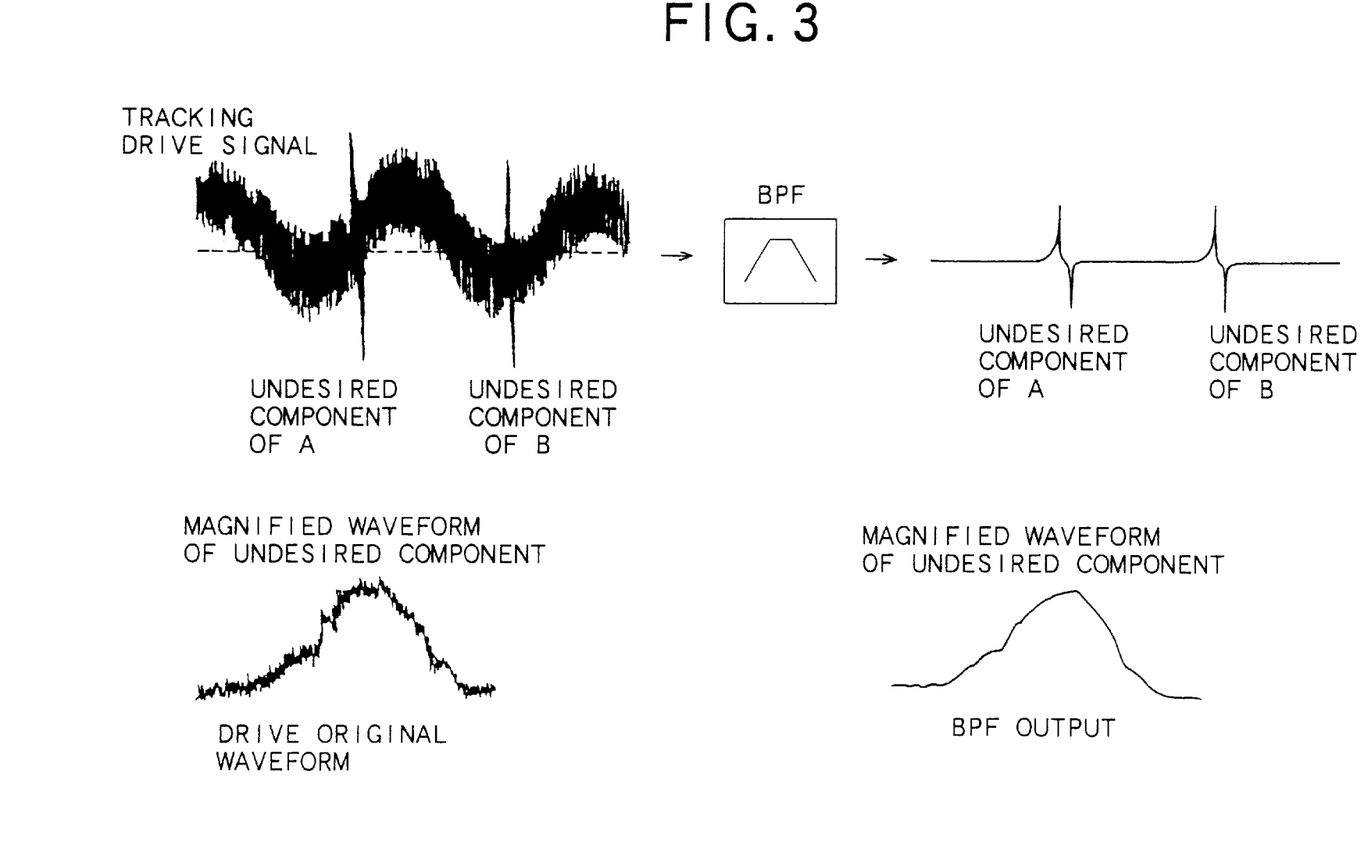
FIG. 3 is a waveform diagram showing input and output waveforms of an undesired component detection equalizer.
Figure 4:
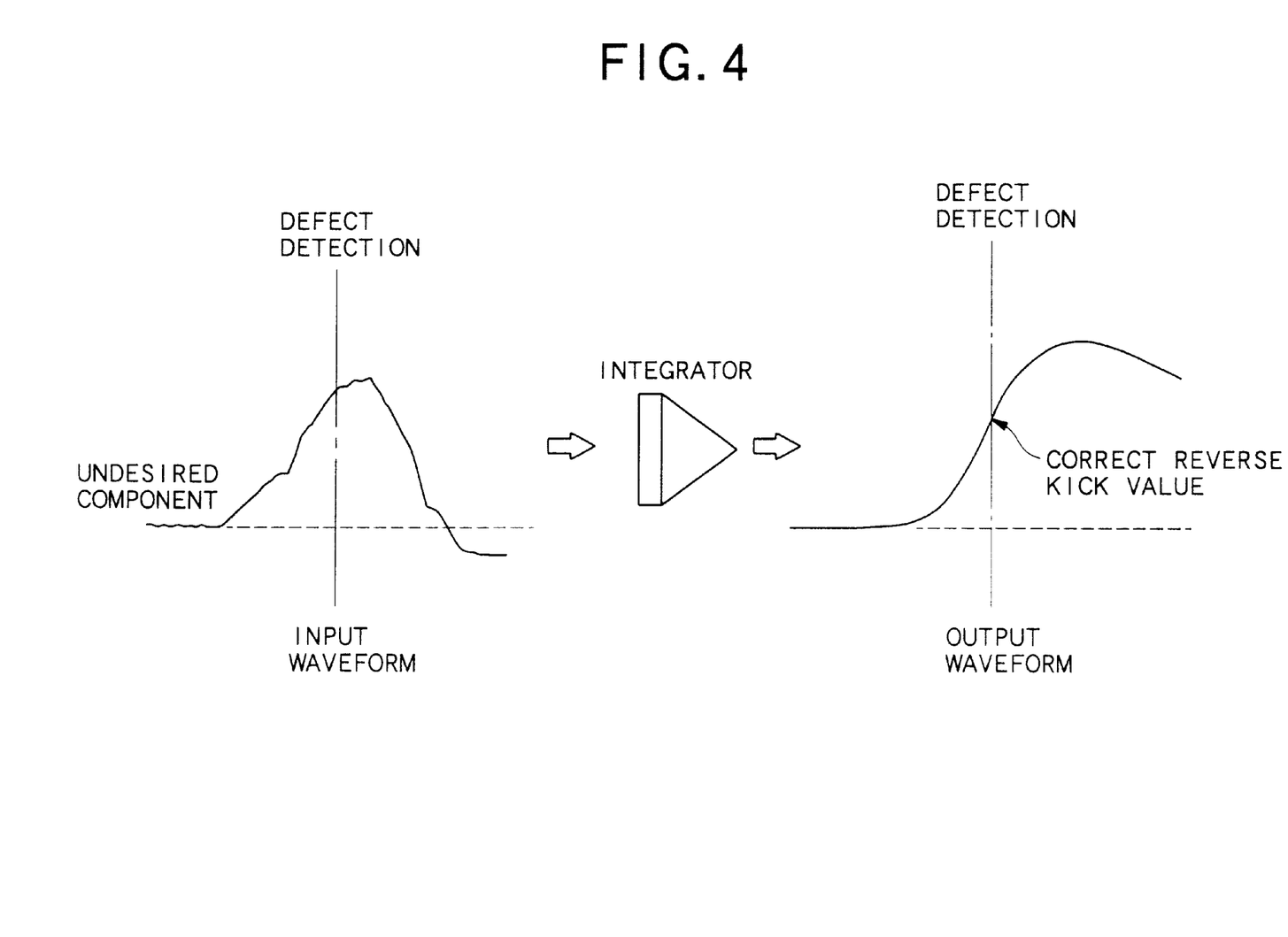
FIG. 4 shows waveforms obtained during integration of undesired component by an integration circuit.

The undesired component detection equalizer 12 includes a band-pass filter including a high-pass filter and a low-pass filter, and extracts the horn-like component from the tracking error signal (TE) inputted by the tracking equalizer 10 at the time when defect is detected. By the undesired component detection equalizer 12, as shown in FIG. 3, only the horn-like component can be extracted even if the tracking error signal (TE) includes eccentric component of low frequency. The integration circuit 13 integrates the horn-like component detected by the undesired component detection equalizer 12. By the integration circuit 13, as shown in FIG. 4, it is possible to calculate the integration result, i.e., the area value, at the time when defect is detected, and the pulse generation circuit 19 generates the correction signal corresponding to this value. The switch 14a supplies the tracking error signal from the pre-amplifier 5 to the AGC block 9 when defect is not detected, and supplies the hold signal of a predetermined voltage level from the hold equalizer 11 to the AGC block 9 when defect is detected. By feeding back the hold signal of the predetermined voltage level to the tracking equalizer 10 via the AGC block 9, the operation of the tracking equalizer 10 may be stabilized. This hold signal may be fed back to the tracking equalized directly, without passing through the AGC block 9. The switch 14b supplies the tracking error signal (TE) from the tracking equalizer 10 to the driver 15 when defect is not detected, and supplies the reverse-pulse signal and the hold signal from the adder 20 to the driver 15 when defect is detected.

Figure 5:
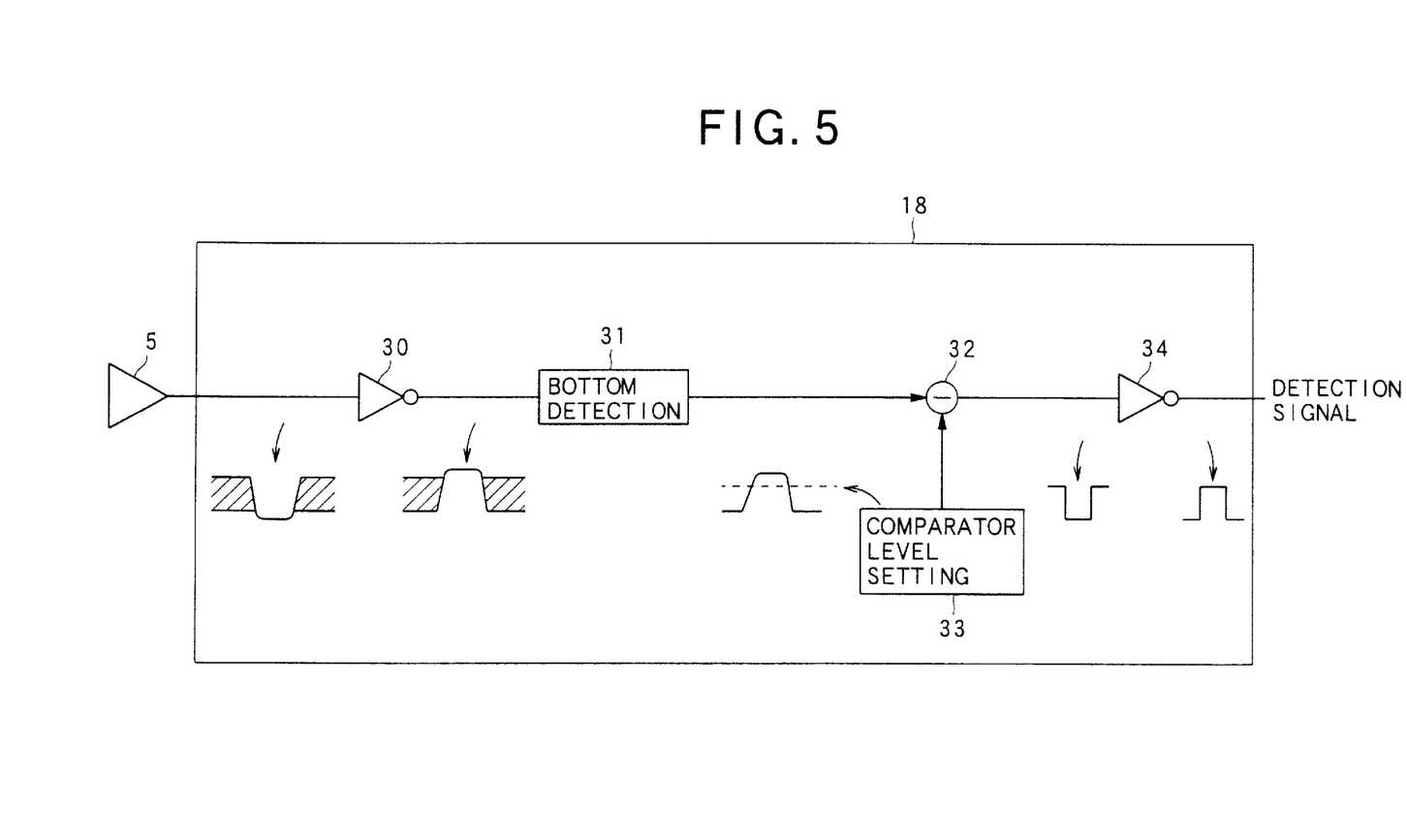
FIG. 5 is a diagram showing the configuration of a defect detection circuit.
Figure 6A:
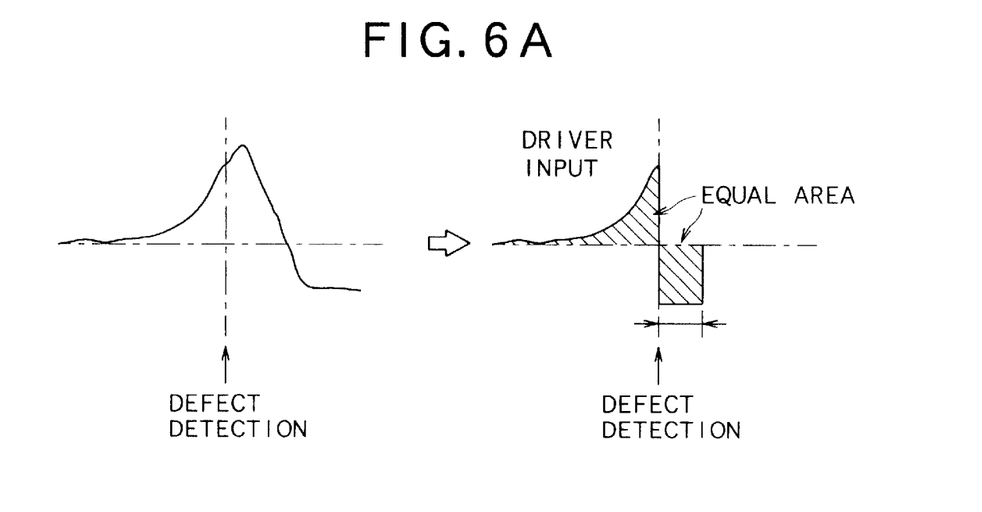
FIGS. 6A and 6B show waveforms of a reverse pulse signal generated by a pulse generation circuit.
Figure 6B:
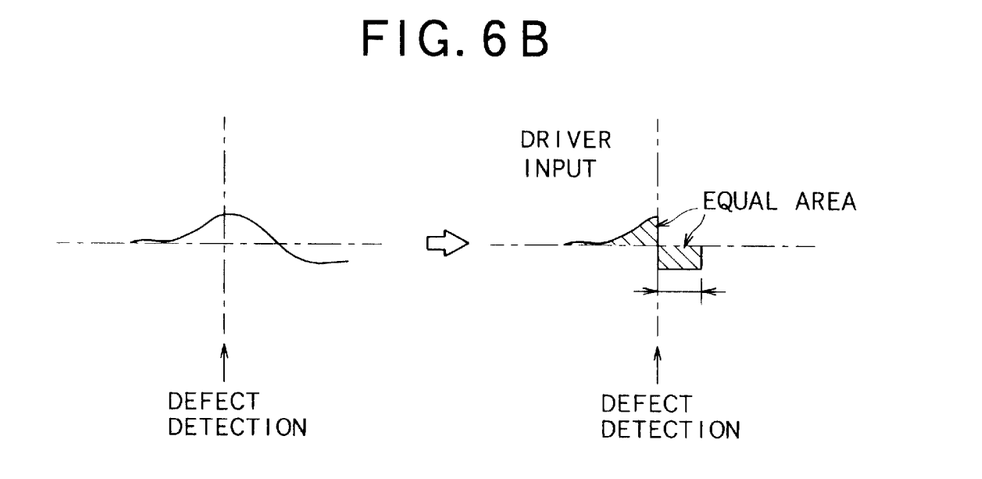

The driver 15 is an optical pickup driving device which current-amplifies the signal supplied from the tracking equalizer 10 or the adder 20 via the switch 14b to drive the focus/tracking coil of the optical pickup 2, the carriage motor 3 and the spindle motor 4. The microcomputer 16 forms the tracking controller together with the tracking equalizer 10 and the hold equalizer 11, and controls whole system. The memory 17 stores information such as AGC value. The defect detection circuit 18 detects defects based on the RF signal generated and outputted by the pre-amplifier 5. As shown in FIG. 5, the defect detection circuit 18 includes an inverter 30, a bottom detection unit 31, a comparator 32, a comparator level setting unit 33 and an inverter 34, and outputs the defect detection signal (DFCT), which is a positive polarity pulse signal, when defect is detected. The pulse generation circuit 19 generates the correction signal (hereinafter referred to as "reverse-pulse signal") for limiting the operation of the optical pickup 2 on the basis of the integration result of the horn-like component calculated by the integration circuit 13 when defect is detected. Thus, as shown in FIGS. 6A and 6B, the reverse pulse corresponding to the magnitude of the horn-like component is generated. Namely, the reverse pulse signal equal to the area of the horn-like component, calculated by the integration circuit 13, is generated. In this embodiment, the applying time period T of the reverse pulse is fixed and the voltage level of the reverse pulse signal is varied in accordance with the size of the horn-like component. However, alternatively, it is possible to fix the voltage level of the reverse pulse signal and vary the applying time period T. The adder 20 adds the reverse pulse signal generated by the pulse generation circuit 19 to the output signal of the hold equalizer 11.

Figure 7:
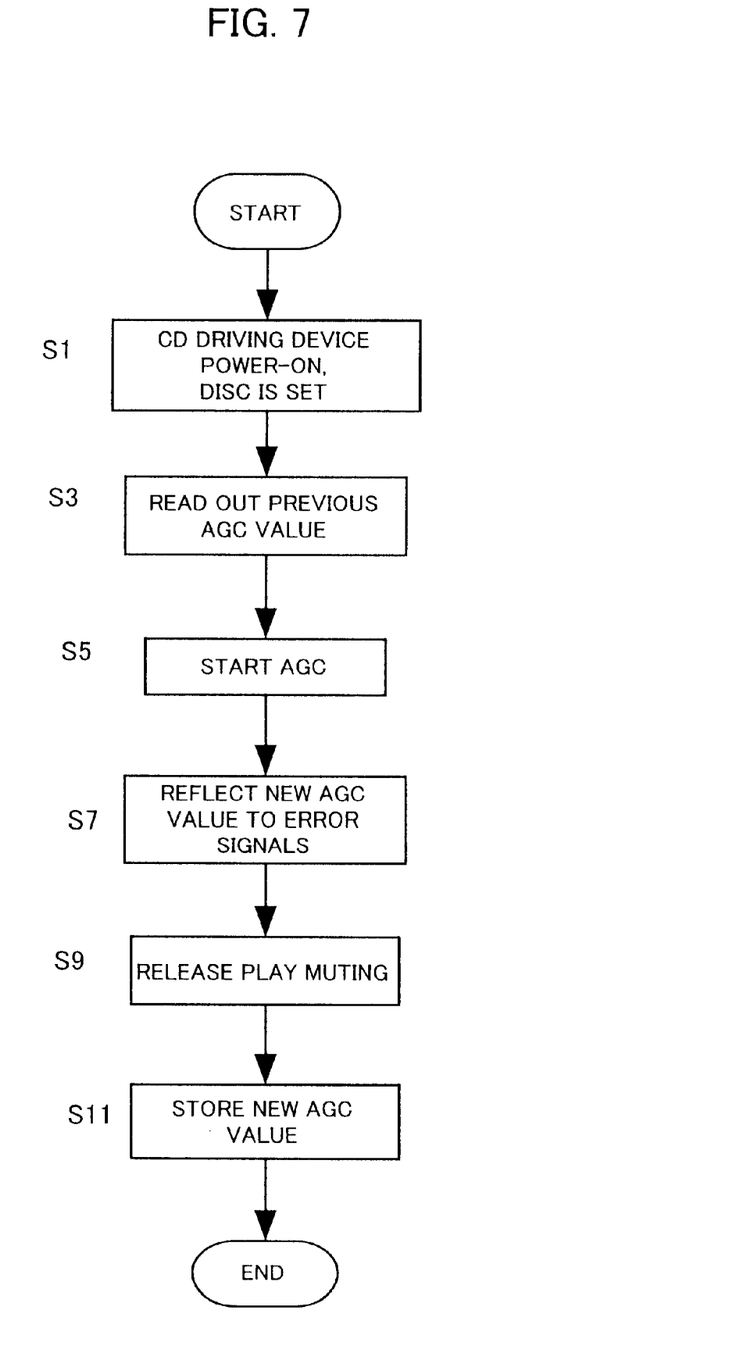
FIG. 7 is a flowchart showing an activation of the CD driving device of the present invention.
Figure 8:
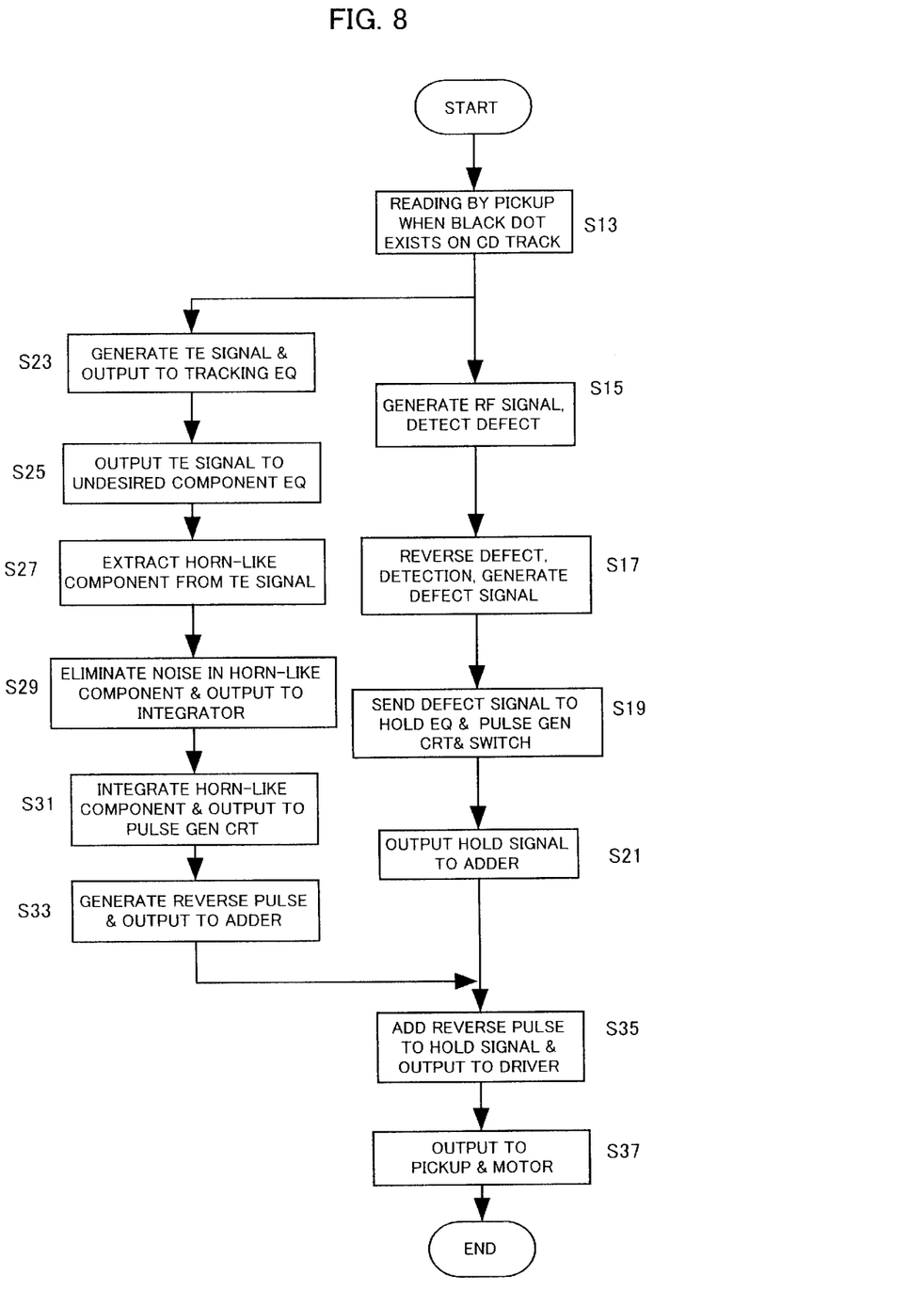
FIG. 8 is a flowchart showing an operation of a servo system at the time when defect is detected.

Next, the operation of the servo system in this embodiment will be described with reference to the flowcharts in FIGS. 7 and 8. First, when the CD driving device is powered ON and the disc 1 is set (step S1), the microcomputer 16 reads out the previous GC value from the predetermined address of the memory 17 and outputs it to the AGC block 9 (step S3). This AGC value includes the focus servo control value (F) and the tracking servo control value (T), and microcomputer 16 outputs the respective values. Then, the AGC is started (step S5). During the AGC, the closed loop gain of the servo system is measured, and the previous AGC value is finely controlled to produce new AGC value and the new AGC value is reflected to the gains of the respective error signals (step S7). When the AGC is completed, the mute signal which stops the dequantized output to the audio signal demodulation system is released and the reproduction of the recorded songs is started (step S9). At an appropriate timing, the new AGC value (including both the AGC values for the focus servo control and the tracking servo control) determined in step S7 is stored in the memory 17 at the predetermined address, and the process ends (step S11). It is noted that the processing shown in FIG. 7 is executed during the set-up processing of the CD driving device when the disc is set in the driving device, or when the key-switch of automobile is turned to the position of the source-ON or accessory (ACC)-ON, or when the power of the driving device is turned ON, for example.

Figure 9A:
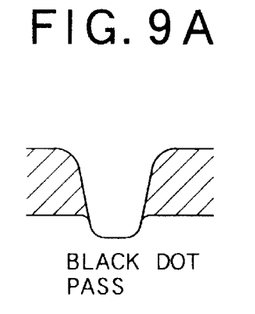
FIGS. 9A to 9C show RF signal processing in the defect detection circuit at the time of passing a black dot.
Figure 9B:
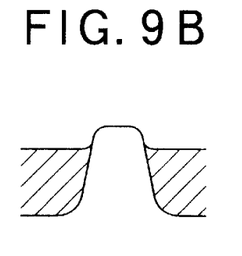
Figure 9C:
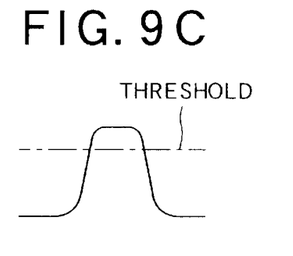
Figure 10A:
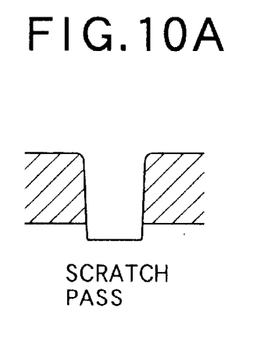
FIGS. 10A to 10C show RF signal processing in the defect detection circuit at the time of passing a surface scratch.
Figure 10B:
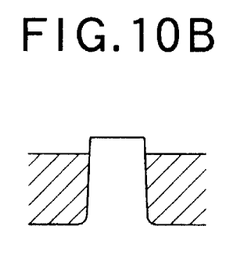
Figure 10C:
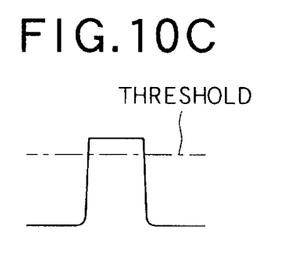

Next, the description will be given of the operation of the servo system in the case where black dot or surface scratch is present on the information track of the disc. If impediments such as black dot or surface scratch is present, when the light beam passes by the impediment, the RF signal read out by the optical pickup 2 (step S13) and generated by the pre-amplifier (step S15) drops to the dark side as shown in FIG. 9A or 10A, and defect is introduced. The RF signal including the defect is inverted by the inverter 30 shown in FIG. 5, and the signal shown in FIG. 9B or 10B is supplied to the bottom detection unit 31. The bottom detection unit 31 performs detection as shown in FIG. 9C or 10C by generating an envelop at the bottom side of the RF signal, and supplies the detected signal to the comparator 32. The comparator 32 receives the predetermined threshold voltage from the comparator level setting unit 33. The comparator 32 outputs a high-level voltage when the detection signal is lower than the threshold voltage and outputs a low-level voltage when the detected signal is higher than the threshold voltage. In other words, if the RF signal includes defect, the output of the comparator 32 takes high-level during the period in which the detected signal is larger than the threshold, i.e., during the period in which black dot or surface scratch is present, and the output of the comparator 32 takes low-level during the period in which no defect is present. It is noted that the time constant of the bottom detection used by the defect detection circuit 18 may be arbitrarily set and the threshold value of the comparator level setting unit 33 may also be arbitrarily set.

Then, the inverter 34 inverts the output signal of the comparator 32 to generate the defect (DFCT) signal (step S17), and supplies it to the hold equalizer 11 and the pulse detection circuit 19 as well as the switches 14a and 14b (step S19). If there is impediment such as black dot or surface scratch on the disc 1, not only the main-beam but the sub-beams pass by the impediment. Hence, if the RF signal includes defect, the read-out signals based on the return lights of the sub-beams also include defect, and correct tracking error signal cannot be obtained. If the tracking error signal obtained when the RF signal includes defect is used as it is, the tracking servo is disturbed. To overcome this, the hold equalizer 11 eliminates the horn-like component from the tracking error signal inputted by the tracking equalizer 10 during the period in which the defect signal takes high-level, and outputs the tracking level following the eccentric component to the adder 20 as the predetermined hold signal (step S21). By this, the tracking servo is stabilized even when defect is detected. It is noted that the hold signal may be generated and outputted, not by the hold equalizer 11, but by the tracking equalizer 10.

Figure 11A:
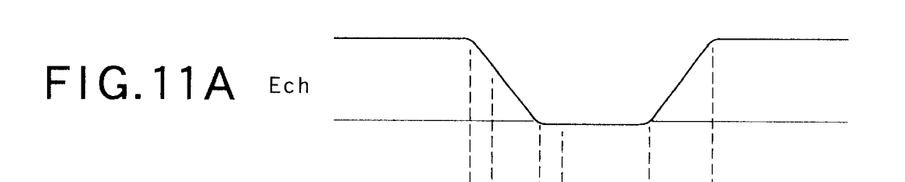
FIGS. 11A to 11C show the mechanism of horn-like undesired component generation at the time when defect is detected.
Figure 11B:
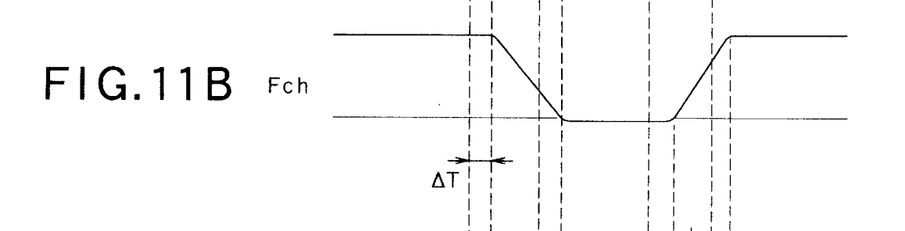
Figure 11C:
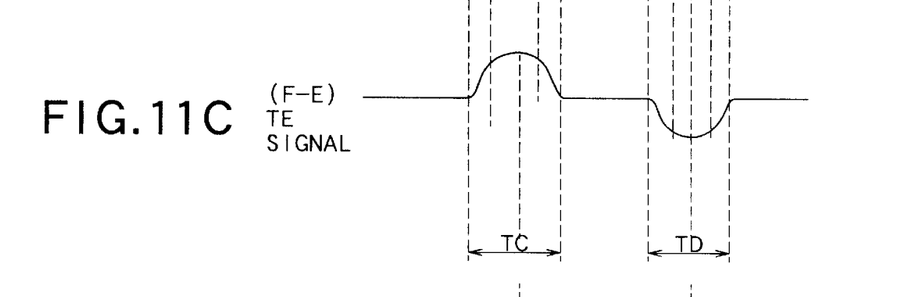
Figure 11D:
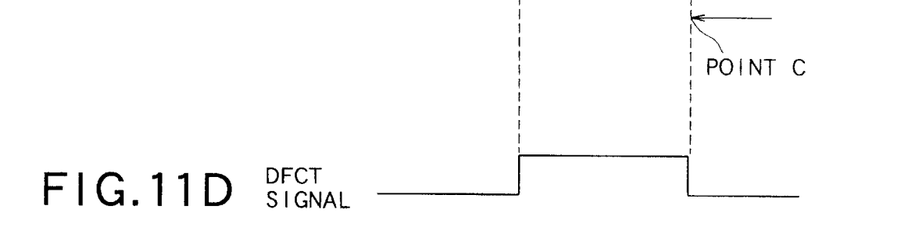

If there is defect, the tracking error signal generated by the pre-amplifier 5 (step S23) includes the horn-like component. Since the horn-like component is generated before the effect by the hold signal appears, this disturbs the tracking servo control. The horn-like component is generated by the following reason. When the sub-beams passes by impediment such as black dot or surface scratch, there is a time difference ΔT from the time when the forward sub-beam enters the impediment to the time when the rearward sub-beam enters the impediment, as shown in FIGS. 11A to 11D. FIG. 11A shows the E-channel output from the photodetector when the forward sub-beam passes by the impediment, and FIG. 11B shows the F-channel output from the photodetector when the rearward sub-beam passes by the impediment. If the time difference ΔT exists, the F-channel output and the E-channel output of the photodetector have the output difference in the time period TC. Therefore, the tracking error signal, which is obtained by the difference of those outputs, varies its level to project to the positive side during this short time period TC and project to the negative side during the time period TD, thereby generating the horn-like component.

The processing for eliminating the influence of this horn-like component will be described below. The tracking error signal including the horn-like component is outputted to the tracking equalizer 10 via the AGC block 9 (step S23). While the defect is being detected, the defect signal (DFCT) is outputted to the switch 14b to connect the contact of the switch 14b to the SW2-side, and the tracking error signal including the horn-like component is not outputted to the driver 15, and is outputted to the undesired component detection equalizer 10 (step S25). Then, the undesired component detection equalizer 12 extracts only the horn-like component by passing the tracking error signal through the high-pass filter (step S27). According to the Compact Disc standard, the tracking error signal normally includes eccentric component of low frequency up to about 500 Hz, and the high-pass filter can separate the horn-like component from the low-frequency eccentric component. Then, the horn-like component thus extracted is passed through the low-pass filter to eliminate the high-frequency noise (step S29). FIG. 3 shows the waveform of the horn-like component thus obtained. The magnitude of the horn-like component varies according to the size of the impediment such as black dot or surface scratch.

Figure 12A:
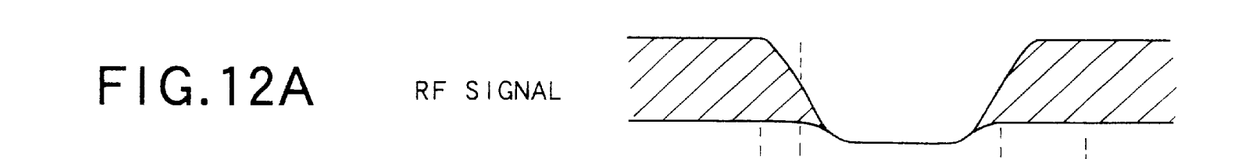
FIGS. 12A to 12F show waveforms of signals in the servo system.
Figure 12B:
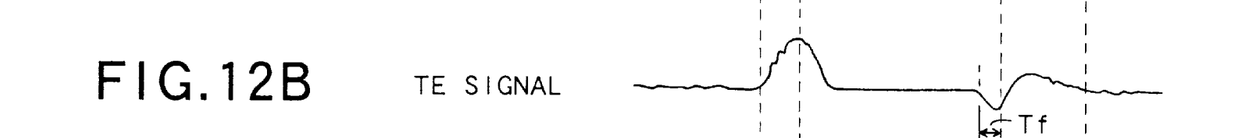
Figure 12C:
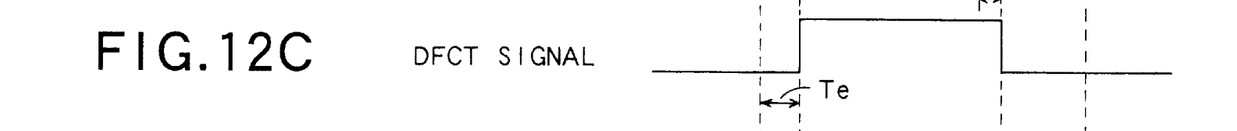
Figure 12D:
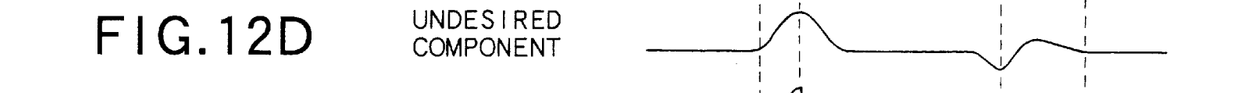
Figures 12E, 12F:
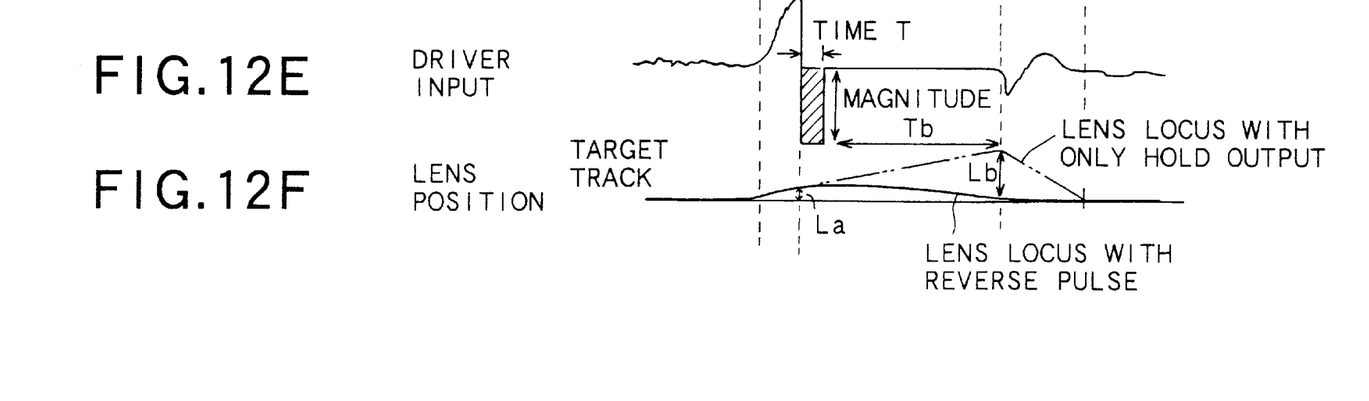

Then, the horn-like component thus extracted is supplied to the integration circuit 13 which integrates the horn-like component until the time of the defect detection. The integration is performed until the time of the defect detection because the signal to the driver 15 is held by the hold signal and the influence by the horn-like component is removed after the time of the defect detection. The result of the integration is supplied to the pulse generation circuit 19 (step S31). The pulse generation circuit 19 generates the reverse pulse signal which is equal to the area value obtained by the integration of the horn-like component, and outputs it to the adder 20 (step S33). Namely, the reverse-polarity voltage having the area equal to the horn-like component is generated, and this may cancel the influence given by the horn-like component to the lens of the optical pickup 2. Then, the adder 20 adds the reverse pulse signal supplied from the pulse generation circuit 19 to the hold signal inputted by the hold equalizer 11, outputs the addition result to the driver 15 via the switch 14b (step S35), and outputs control commands to the optical pickup 2 and the respective motors (step S37). FIGS. 12A to 12F show the waveforms of signals in the servo system. As shown in FIG. 12E, the influence of the horn-like component is canceled by the reverse-pulse signal. By this, the movement of the lens in the optical pickup may be suppressed to be extremely small. Namely, against the force of the horn-like component in the acceleration direction applied by the driver 15 to the optical pickup 2, the force in the deceleration direction of the reverse-pulse signal is applied. As a result, as shown in FIG. 12F, the movement of the lens in the optical pickup 2 is suppressed to be smaller than the movement amount La, compared with the movement amount Lb in the case where no reverse pulse is applied. Further, since the magnitude of the reverse pulse is automatically set in accordance with the magnitude of the horn-like component, the adverse effect of the horn-like component may be stably suppressed even if the magnitude of the horn-like component varies according to the varying shapes of black dot or surface scratch.

After the output of the reverse pulse signal, the signal of the hold level is supplied to the driver 15 during the time period Tb in which the defect detection signal (DFCT) is high level, and thus stable tracking servo is achieved. As shown in FIG. 12B, since the tracking error signal (TE) varies during the time period Tf in the direction reverse to the variation of the tracking error signal during the time period Te, the driver 15 receives the signal of a polarity reverse to the signal polarity during the time period Te. However, since the hold signal is supplied to the driver 15 during the time period Tf in which the tracking error signal (TE) varies, the variation of the tracking error signal (TE) during the time period Tf does not affect the movement of the lens position.

In the above description, the polarity of the reverse pulse signal is negative because the polarity of the horn-like component supplied to the driver just before the defect detection signal (DFCT) becomes high level is positive. However, the polarity of the horn-like component varies according to the configuration of the pre-amplifier 5. If the polarity of the horn-like component is negative, the polarity of the reverse pulse signal should be positive.

As described above, the device according to the present invention detects the horn-like component which is generated when the optical pickup of the driving device for the optical storage medium passes by the impediments such as black dot or surface scratch on the information track of the disc, and supplies the reverse pulse signal corresponding to the magnitude of the horn-like component. Therefore, the adverse affect by the horn-like component to the lens of the optical pickup may be cancelled out, and the unnecessary movement of the lens of the optical pickup may be suppressed. Further, since the reverse pulse signal is automatically generated in accordance with the magnitude of the horn-like component, the adverse effect of the horn-like component may be stably cancelled even if the magnitude of the horn-like component varies due to the shape variation of black dot or surface scratch.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.11-189612 filed on Jul. 2, 1999 including the specification, claims, drawings and summary is incorporated herein by reference in its entirety.

What is claimed is:

1. A driving device for an optical storage medium, comprising:

an optical pickup for reading out information from an information track on the optical storage medium, the optical pickup comprising (i) an irradiating device for irradiating a main-beam on the information track and two sub-beams at two different positions in a tangential direction of the optical storage medium and (ii) a photodetector device for detecting the main-beam and the two sub-beams reflected by the optical storage medium;

a tracking error signal generator for generating a tracking error signal based on the two sub-beams detected by the photodetector;

a tracking controller for controlling the optical pickup to follow the information track on the optical storage medium based on the tracking error signal generated by the tracking error signal generator;

a defect detector for detecting a defect of the information caused by impediments existing on the optical storage medium based on the main-beam detected by the photodetector;

a disturbance detector for detecting a magnitude of a disturbance of the tracking error signal when the defect of the information is detected by the defect detector;

a correction signal generator for generating a correction signal corresponding to the magnitude of the disturbance of the tracking error signal detected by the disturbance detector; and a limiting unit for limiting an operation of the tracking controller in accordance with the correction signal generated by the correction signal generator.

2. The driving device according to claim 1, wherein the irradiating device irradiates two sub-beams at two different positions in a radial direction of the optical storage medium.

3. The driving device according to claim 2, wherein the correction signal has a fixed time width and a voltage level which is variable in accordance with the magnitude of the disturbance of the tracking error signal.

4. The driving device according to claim 2, wherein the correction signal has a fixed voltage level and a time width which is variable in accordance with the magnitude of the disturbance of the tracking error signal.

5. The driving device according to claim 1, wherein the disturbance detector calculates the magnitude of the disturbance of the tracking error signal by integration.

6. The driving device according to claim 1, wherein the irradiating device irradiates one sub-beam at the position ahead of the position irradiated by the main-beam and another sub-beam at the position behind the position irradiated by the main-beam, to the tangential direction of the optical storage medium when the information is read out from the information track.

7. The driving device according to claim 1, wherein the disturbance detector for detecting the magnitude of the disturbance of the tracking error signal utilizes a different timing between the two sub-beams for irradiating impediments existing on the optical storage medium.

8. A driving device for an optical storage medium, comprising:

a three-beam optical pickup for projecting, onto an optical storage medium, a main-beam for RF signal detection and two sub-beams for tracking error signal detection, the main-beam movably set for irradiating a centerline of an information track of the optical storage medium and the two sub-beams set to irradiate the information track at two different positions shifted from the centerline in a rotation direction and a radial direction of the optical storage medium, the optical pickup further including a photodetector set to detect the main-beams and two sub-beams as reflected from the optical storage medium;

a tracking error signal generator connected to outputs of the photodetector to i) sense the detected main-beam and ii) sense the detected two sub-beams and develop a tracking error signal based on the detected two sub-beams;

a tracking controller operatively connected to position the optical pickup based on the tracking error signal from the tracking error signal generator;

a defect detector connected to an output of the tracking error signal generator and configured to detect a surface defect on the optical storage medium based on the detected main-beam;

a disturbance detector configured to detect a magnitude of a disturbance of the tracking error signal upon the defect detector detecting the defect;

a correction signal generator for generating a correction signal corresponding to the magnitude of the disturbance of the tracking error signal from the disturbance detector; and a limiting unit for limiting an operation of the tracking controller in accordance with the correction signal generated by the correction signal generator.

9. The driving device of claim 8, wherein, the photodetector comprises:

a main photodetector to detect the main-beam;

a first sub-beam photodetector to detect a first of the two sub-beams;

a second sub-beam photodetector to detect a second of the two sub-beams; and the main photodetector positioned intermediate the first and second sub-beam photodetectors.

10. The driving device of claim 9, wherein, the tracking error signal generator comprises an input from the first sub-beam photodetector and an input from the second sub-beam photodetector to determine a difference signal between the two sub-beams, when the main-beam is positioned on the centerline, the difference signal between the two sub-beams equals zero, and when the main-beam moves off the centerline in the radial direction, a first of the inputs from the first and second sub-beam photodetectors increases and a second of the inputs from the first and second sub-beam photodetectors decreases, a difference between the first and second inputs being the tracking error signal.

11. The driving device of claim 10, wherein, two sub-beams are set to irradiate the information track at two different radially opposing positions shifted from the centerline of the optical storage medium so that one of the sub-beams is set to irradiate the information track radially off center on a first side of the centerline and the other one of the sub-beams is set to irradiate the information track radially off center on a second, opposite side of the centerline.

12. The driving device of claim 8, wherein, two sub-beams are set to irradiate the information track at two different radially opposing positions shifted from the centerline of the optical storage medium so that one of the sub-beams is set to irradiate the information track radially off center on a first side of the centerline and the other one of the sub-beams is set to irradiate the information track radially off center on a second, opposite side of the centerline.

* * * * *